Sheet 1,
3 Sheets
W. Plumer.
Stone Channeling Mach.
No. 3,369. Reissued Apr. 13, 1869.
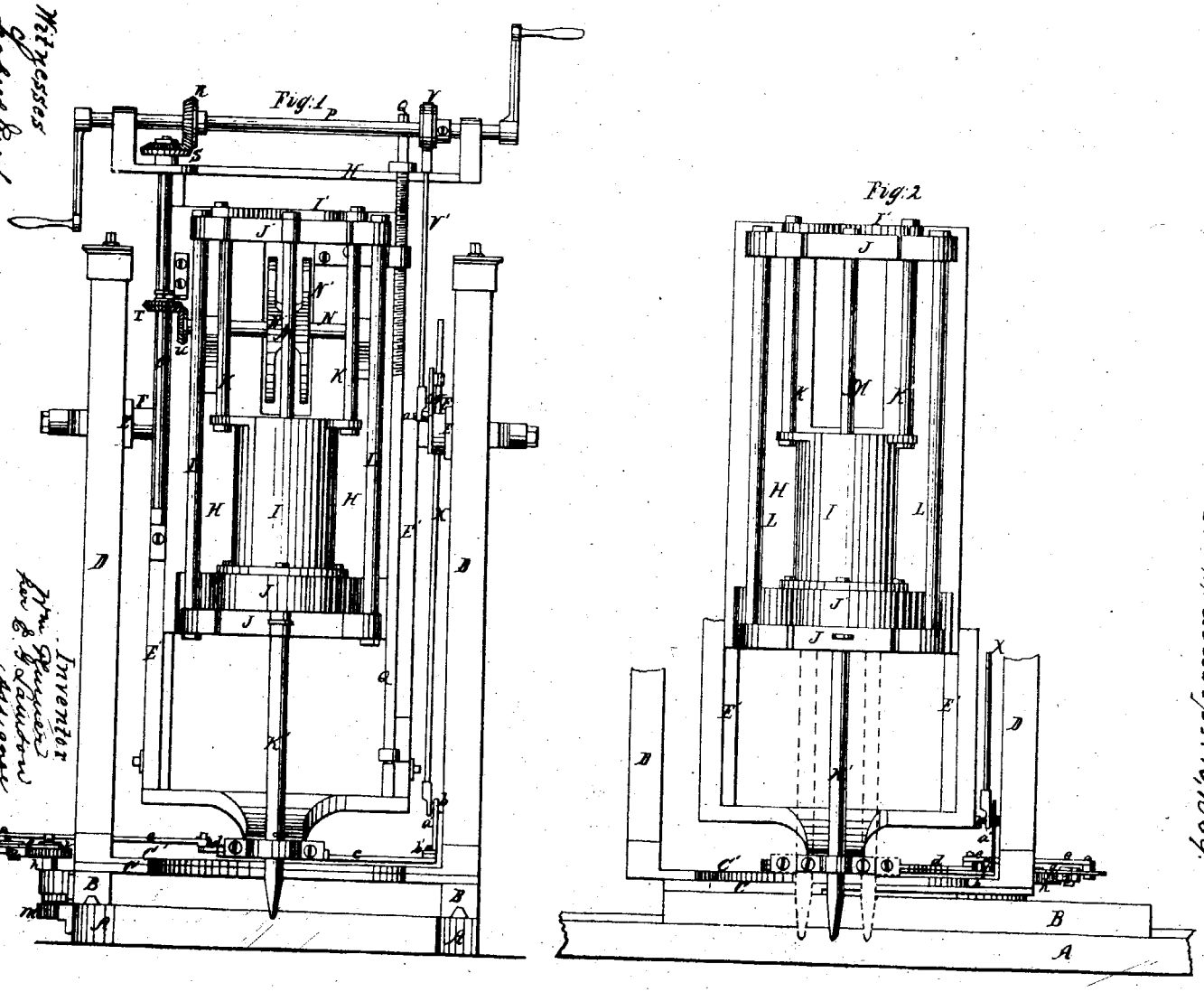
Witnesses
Leopold Everts
J. R. Hayes
Inventor
Wm. Plumer
per E. G. Lawton
Assignee
per Alexander Hudson
Atty Sheet 2,
3 Sheets.
W. Plumer.
Stone Channeling Mach.
No. 3,369. Reissued Apr. 13, 1869.
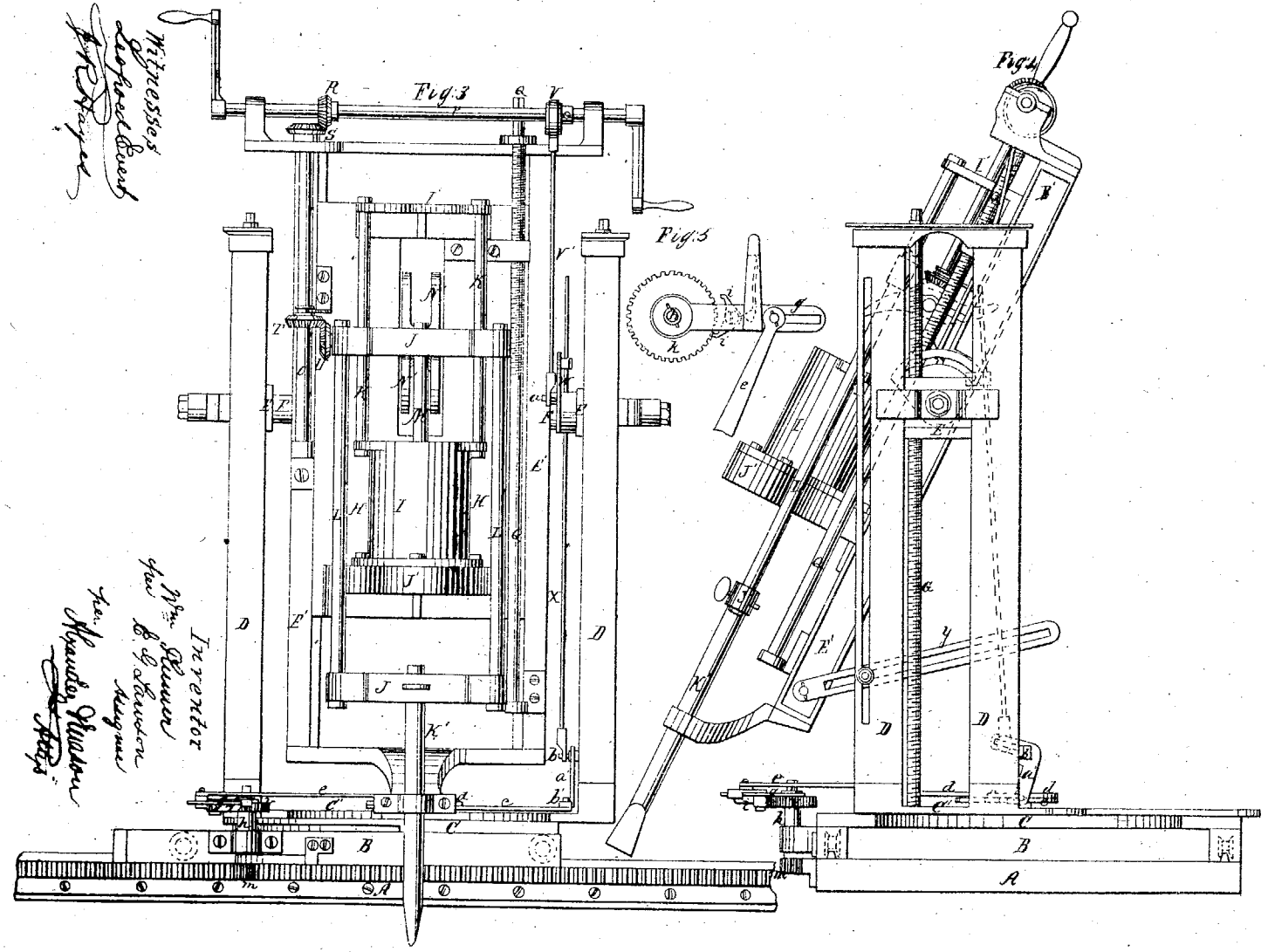
Witnesses
Leopold Evert
F. R. Hayes
Inventor
Wm. Plumer
per C. G. Lawson
Assignee
per Alexander Hudson
Atty.

Sheet 3,
3 Sheets.
W. Plumer.
Stone Channeling Mach.
No. 3,369. Reissued Apr. 13, 1869.
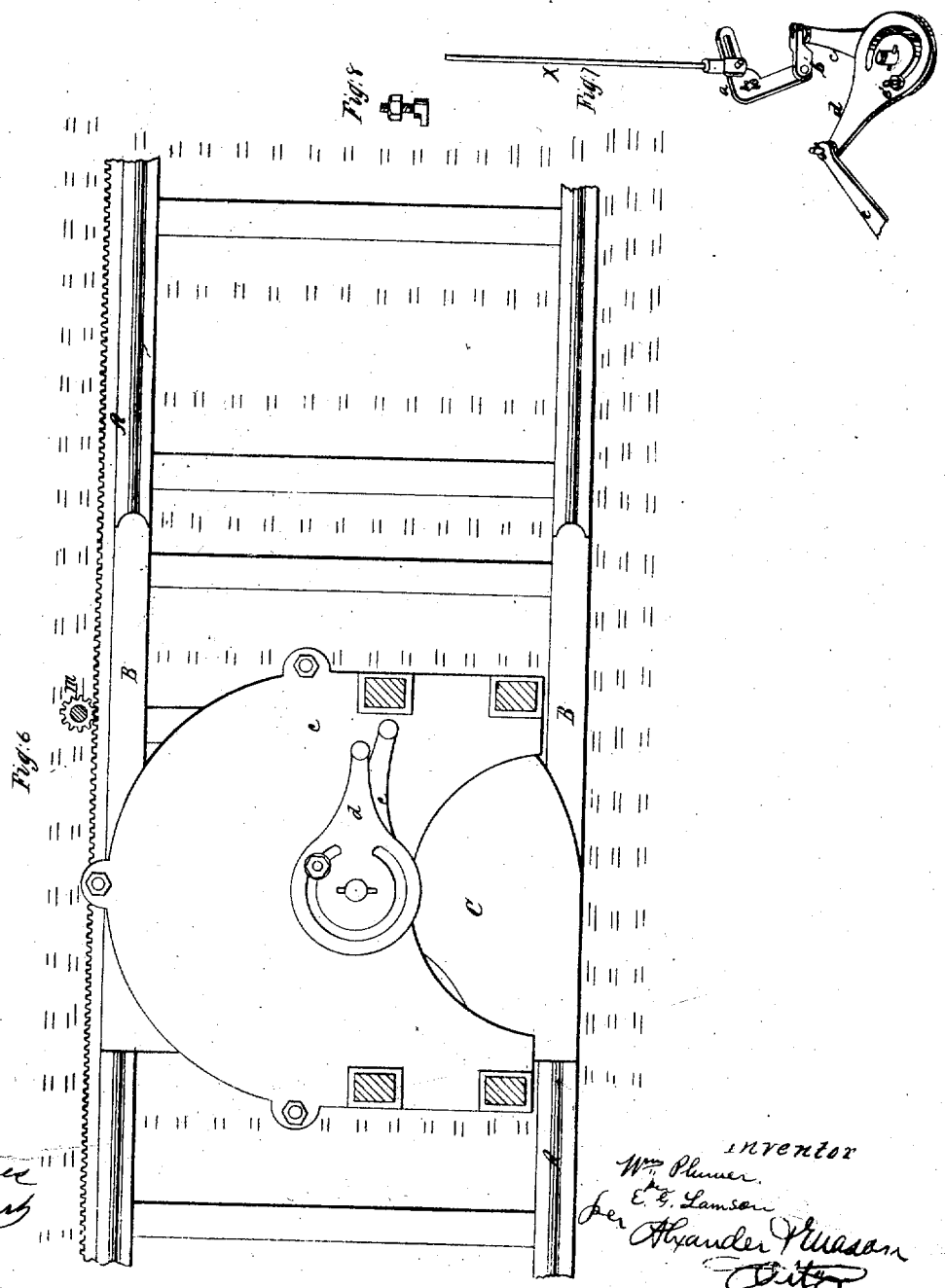
Witnesses
J. R. Stager
Leopold Quert
Inventor
Wm. Plumer.
E. G. Lamson
per Alexander Mason
Atty.

BEST AVAILABLE COPY

UNITED STATES PATENT OFFICE.

E. G. LAMSON, OF WINDSOR, VERMONT, ASSIGNEE OF WILLIAM PLUMER.

IMPROVED ROCK-CHANNELING MACHINE.

Specification forming part of Letters Patent No. 18,352, dated October 6, 1857; Reissue No. 3,369, dated April 13, 1869.

DIVISION B.

*To all whom it may concern:*

Be it known that WILLIAM PLUMER, of Boston, in the county of Suffolk and State of Massachusetts, did invent certain new and useful Improvements in Machines for Cutting and Channeling Rocks, Minerals, &c.; and I do hereby declare that the following is a full, clear, and exact description thereof, reference being had to the accompanying drawings, and to the letters of reference marked thereon, and in which—

Figure 1 is a front elevation, showing the drill operating in front of the frame and between the track. Fig. 2 is a sectional front view, showing the frame with a drill, its standard-guides, and the manner of attaching one or more drills to operate outside the frame and track. Fig. 3 is a front elevation, showing the drill and its feed-works, and operating outside the frame and track. Fig. 4 is a side elevation, showing the drilling devices placed at an angle and operating outside the frame and track. Fig. 5 is a view of the feed mechanism that is operated upon the rack on the track. Fig. 6 is a plan view of the track, showing the rack and pinion and segmental tables on which the machine rests; and Fig. 7 is a perspective of the apparatus or device, which causes the operation of the feed mechanism. Fig. 8 shows the clamp-fastening of the segmental tables.

This invention relates to a machine for cutting seams or grooves in marble or any kind of stone where large blocks are to be taken out, and is particularly and admirably adapted for cutting long seams or grooves in a straight line with the track or way upon which the whole machine is carried along by means of eccentric rack-and-pinion feed-works. This machine is also particularly adapted for cutting seams or grooves on both sides of the machine outside of frame and outside of track, and by the operation of the devices in its mechanism can be made to cut seams and grooves between the tracks or ways, as will be hereinafter described.

A very important feature of this invention is, that it enables the operators to follow accurately the dip or strata of marble, as in nearly all quarries the marble lies in geological formation in layers of from one to five feet thick. Heretofore the seams or grooves have been cut by hand and at different angles in order to save material and to obtain blocks of the same quality in structure, for no machine has been able to do this successfully.

The method of hanging the mechanism on movable trunnions which carries the cutters and main driving-shaft with feed-works, so that the whole cutting mechanism may be turned to cut a channel at any desired angle, is one subject of this invention, and will be presently described.

In the accompanying drawings, making a part of this specification, A represents a track or way upon which the machine is intended to be placed and to move. This track may be made of any length less, say, than one hundred feet, and in sections of about twelve feet each, and provided on one side with a rack, in which a pinion, hereinafter to be described, works and moves the machinery along the track. The two sides of this track are connected together by braces extending from side to side, and the whole track fastened to the rock in any suitable manner. When it is essential to cut grooves or seams between the tracks, these braces may be removed and the two sides of the track themselves fastened to the rock in any suitable manner, so as to permit the cutters to come between the tracks by the operation of the machinery to be described.

B represents the frame or base of the machine, made of metal, and provided with grooves in the under side, which fit in the track; or, instead of grooves, wheels may be attached to the base to run upon the track. To one side of this frame is attached the pinion that works in the feed-rack on one side of track A. Secured to frame B, that supports the whole mechanism, is the segmental plate C, made of metal, with an aperture for the insertion of a pivot, by which it is connected with another or upper plate, C′. The metal base B and metal segmental plate C may be cast together, so as to form one piece. The plate C′ is secured to plate C by screw-clamps passing through ears on the plate, as seen in Figs. 7 and 8. The metal plate C′, which is also segmental, but may be of any other suitable shape, rests upon plate C, and is pivoted to it in such a manner that it can readily be revolved at pleasure.

Erected upon the plate C′ are four standards, D D, which support the cutter-frames and cutting mechanism of the machine. These standards are in pairs on each side, at their lower ends fastened rigidly to plate C′, and at the upper ends united together by caps or braces. Between each pair of standards a sufficient space is left to receive a movable metallic block or nut, E. These nuts or blocks are adjustable within the openings between the standards, and are provided with suitable clamp-screws, so that they may be stationed at any desired point upon the standards. Passing into these nuts or blocks E are two trunnions, F F, which trunnions are made fast to or form a part of the frame E′.

E′ represents a frame, which is made of metal, and is rectangular in form. This frame is provided upon its outer edges of its sides with grooves or channels, in which the trunnions are fitted. When these trunnions are placed in the grooves in frame E′, upon each side, it will be readily understood that the said frame E′ may be partially revolved upon the trunnions and set at any angle which may be desirable. The frame E′ may be raised or lowered with reference to the trunnions, or the nuts or blocks E may be raised or lowered between the standards, so as to raise or lower the said frame. Within the frame E′ is placed another metallic frame, H, the sides of which are grooved to receive tongues upon the inner edges of the sides of the frame E′. This frame H has two flanges or projections formed or cast upon its face, which stand at right angles to it, and which are marked I′ and J′. Upon the lower flange is placed a cylinder, I, in which is placed a piston-head and pistons. Upon the upper end of the cylinder and extending out from it on each side, are two lugs or rings, through which the lower ends of the guide-rods K K pass, and in which they are made fast. The upper end of these guide-rods are made fast to the flange I′.

J J represent two clamps, which are placed at a suitable distance apart, and which are connected together by means of the clamp or connecting rods L L. The guide-rods K K pass through the upper clamp, while the cutter K′ passes into and is secured in the lower clamp by means of a pin. This pin adjusts the cutter to any direction required. When necessary to change the angle of the cutting-edge, the pin is taken out and the cutter turned, when the pin is again inserted and screwed on the top. As the drill K′ stands immediately under the cylinder I, it may be extended through said cylinder and its upper end made to answer the place of the piston-rod M, which is made fast, as seen, to the center of the upper clamp. When the machine is in operation, the clamps, with their rods, together with the cutter and piston rod and head, rise and fall as fast as operated upon in one direction by certain cams, which will be hereinafter described. The lower end of the cylinder is closed, with the exception of a small valve-opening, while its upper end is open. The frame H is raised or lowered or adjusted within frame E′ by means of a screw-shaft, O, one end of which is connected to frame E′, while it passes through a threaded lug or ring on the frame H.

The mechanism which operates the cutter and its connections in one direction—that is, lifts it—will now be described.

Lying crosswise of the frame E′, at its upper end, is a crank-shaft, P. This shaft, with others which will be described, of course has suitable bearings in the frame to which it is connected. Upon the shaft P is a bevel-wheel, R, which gears into a similar wheel, S, on a shaft, O. The shaft O lies upon one side of the frame E′ and in the line of its length. Upon this shaft is another bevel-wheel, (marked T,) which is so arranged as to gear into a similar wheel, U, on the shaft N, bearing the cam N′.

To the driving-shaft P is attached an eccentric, V, which gives motion to the arm V′, which is secured to the upper end of the slotted quadrant-shaped plate W, that turns upon a bearing at *a*.

To the lower end of the quadrant-plate is attached a vertical rod, X, which receives an up-and-down motion and operates the right-angular lever *a*′, that turns upon a fulcrum at *b*, one end of which lever is connected by a pivot-joint to a short horizontal arm fastened to the flat arm *c*. The circular end of this arm turns upon the bearing, before referred to, as a center, and has a circular groove formed in it, in which is inserted a screw-bolt, *c*′, which binds the arm *c* to a similar arm, *d*, having a circular groove or slot. The slotted arms are so arranged as to permit the plate C′ to be revolved, and thereby the whole cutting apparatus turned at right angles to the cut, as by loosening the screw-bolt *c*′ the arm *d* can travel freely over the arm *c* by reason of the circular slots in the round arms.

To the arm *d* is attached a connecting-rod, *e*, which gives a forward and backward motion to the horizontal arm *g*, that turns upon the short vertical shaft *h*, attached to the frame B. The arm *g* carries a double pawl, *i*, that engages with a ratchet-wheel, *k*, made fast to the shaft *h*, which at its lower end carries the pinion *m*, which works in the feed-rack on one side of the track A, as above described, and thereby feeds the frame B, and, consequently, the whole drilling apparatus along in a horizontal direction and in the direction of the track.

By tightening the screw-bolt *c*′ when the cutting apparatus is set in the desired position, the arms *c* and *d* are fastened together, whereby the lateral feeding movement is communicated to the whole cutting apparatus.

The drilling or cutting tool is fed backward over the track by simply reversing the double pawl *i*.

The machines that have been known do not combine the following particulars, which are embraced in this invention.

From the operation of this machine it will be observed that grooves can be cut perpendicular in a line with the track of any depth and of any length in reference to the amount of track used; secondly, a groove can be made by this machine at any angle of inclination from the track, and at any depth, yet still in line with the track, by simply moving the trunnions; thirdly, by turning the upper plate, *c'*, the mechanism carries the cutting device near or remote from the track, thus varying the size of the block; fourthly, by turning the upper plate or plate *c'* on its pivot the whole cutting mechanism can be brought around to the other side of the track, and the same grooves can be made without moving the track; fifthly, by turning the plate to any desired point, the chisel or cutter can be brought inside the track by removing the braces holding together the two sides of the track and fastening the same down in any convenient way. It will be thus seen by this arrangement that almost any number of grooves may be cut inside as well as outside the track, without moving the latter along the whole distance of one hundred feet, or any desired length of track.

The arrangement for holding the cutter is a very important improvement. The cutter is confined to what is called a "lower clamp," as has been described, by means of a nut and screw and a pin passing through both the cutter and clamp, and from the lower clamp there are two rods running to the upper clamp, called the "connection-rods" of the clamps. The upper clamp runs upon bars or standards that serve as guides, and is operated by the cam by means of the driving-wheel. The cam operating upon the clamp and cutter, the piston is drawn up, and a vacuum produced in the air-cylinder, and the clamps and drills are therefore thrown down by means of atmospheric pressure.

It will be seen that the clamp connecting-rods L L are caused to play up and down, over or around the standard-guides K K, by the action of the cams N' on the cross-shaft N, which alternately strike the upper clamp, J. This carries the drill or drills upward, and with them the piston and piston-head in the cylinder I, so that when the cam has released itself from the upper clamp the drill or drills are caused to descend onto the stone with great velocity by the means of atmospheric pressure.

The mode of securing the cutter or cutters to the foot drill-clamp by the pin and screw may be changed for any mechanical equivalent device or devices. I may, for instance, connect the cutter or cutters by a clamp or any other known mechanism. The space for the drills to pass through in the clamps may be enlarged for placing two, three, or a gang of cutters, as shown in red lines in Fig. 2 of the drawings, so that two or more edges may strike the rock at one stroke of the mechanism.

Having thus fully described his invention, what I claim as new, and desire to secure by Letters Patent, is—

1. A stone channeling or grooving machine which is constructed to move upon a track, and provided with a reciprocating cutter or cutters, so arranged as to cut seams or grooves outside of frame and track and in a line with the track, substantially as herein set forth.

2. A stone channeling or grooving machine which is constructed to move upon a straight track, which is provided with reciprocating cutters, which are arranged to cut seams or grooves between the tracks or ways, in the manner set forth.

3. A stone channeling or grooving machine which runs upon a track, and which is provided with a cutter or cutters attached to a cutter-holder, which cutter-holder moves freely on standard-guides, the holders being operated upon by suitable mechanism for raising the cutter or cutters, substantially as set forth.

4. The arrangement of the cutter-holder with cutter or cutters attached to slide freely on standard-guides, confined to a frame or plate which is hung on trunnions, substantially as and for the purposes set forth.

5. A stone cutting or grooving machine with chisels or drills that are operated upon a frame and track when said frame is supported upon trunnions, and held by adjustable braces for giving the cutting-instruments any desired angle, substantially as herein set forth.

6. In combination with a stone grooving or channeling machine, a horizontal rack-bar placed either on the inner or outer surface of the track, and a pinion attached to the mechanism of the machine, whereby the same is fed along, substantially for the purposes set forth.

7. Operating the feed mechanism as well as the cutting mechanism of a stone grooving or channeling machine by a crank-shaft, eccentric, or equivalent device, substantially as set forth.

8. In a stone grooving, drilling, or channeling machine that is moved along upon a track or way, a double-acting pawl acting upon a ratchet, or their respective equivalents, whereby the pinion is caused to feed into the rack-bar on the track, substantially as set forth.

9. A slotted arm, lever, or elbow, or their equivalents, connected with the feed mechanism of a stone drilling, cutting, or channeling machine, whereby I may regulate the progress of the machine and its cutters on the stone so as to feed the mechanism faster or slower while the cutters are operating, substantially by the means and for the purposes specified.

10. The hanging frame E', which carries the cutters on trunnions, and the adjustable brace *y* or its equivalent, for the purpose of giving any desired angle to the cutters, substantially as set forth and described.

11. Giving a forward or backward movement to the stone-cutting machine at pleasure and simultaneously with the upward stroke of the reciprocating cutters, and confining said machine positively in position upon its track during the descending stroke of the said cutters, substantially by the means as herein set forth.

12. The employment of an air-cylinder in a stone cutting or channeling machine, for the purpose of assisting the force of the cutter or cutters on their descent to the stone, substantially as set forth.

13. The upright screw-shaft O, arranged upon the frame E′, for the purpose of feeding down the frame H, and the cutting mechanism, substantially as specified.

14. The vertical screw-rods *o′ o′*, between the standards D D, on each side of the plate C′, for the purpose of allowing the frame E′, which is supported upon trunnions, to be raised or lowered between the standards, and set at any desired angle by the braces *y y*, or their equivalents, and stationed in position, substantially as herein specified.

In testimony that I claim the foregoing I have hereunto set my hand this 18th day of March, 1869.

E. G. LAMSON.

Witnesses:
JNO. O. GOODRICH,
J. M. MASON